Sept. 22, 1953      J. M. KEEGAN      2,652,703
COASTER
Filed Oct. 22, 1949
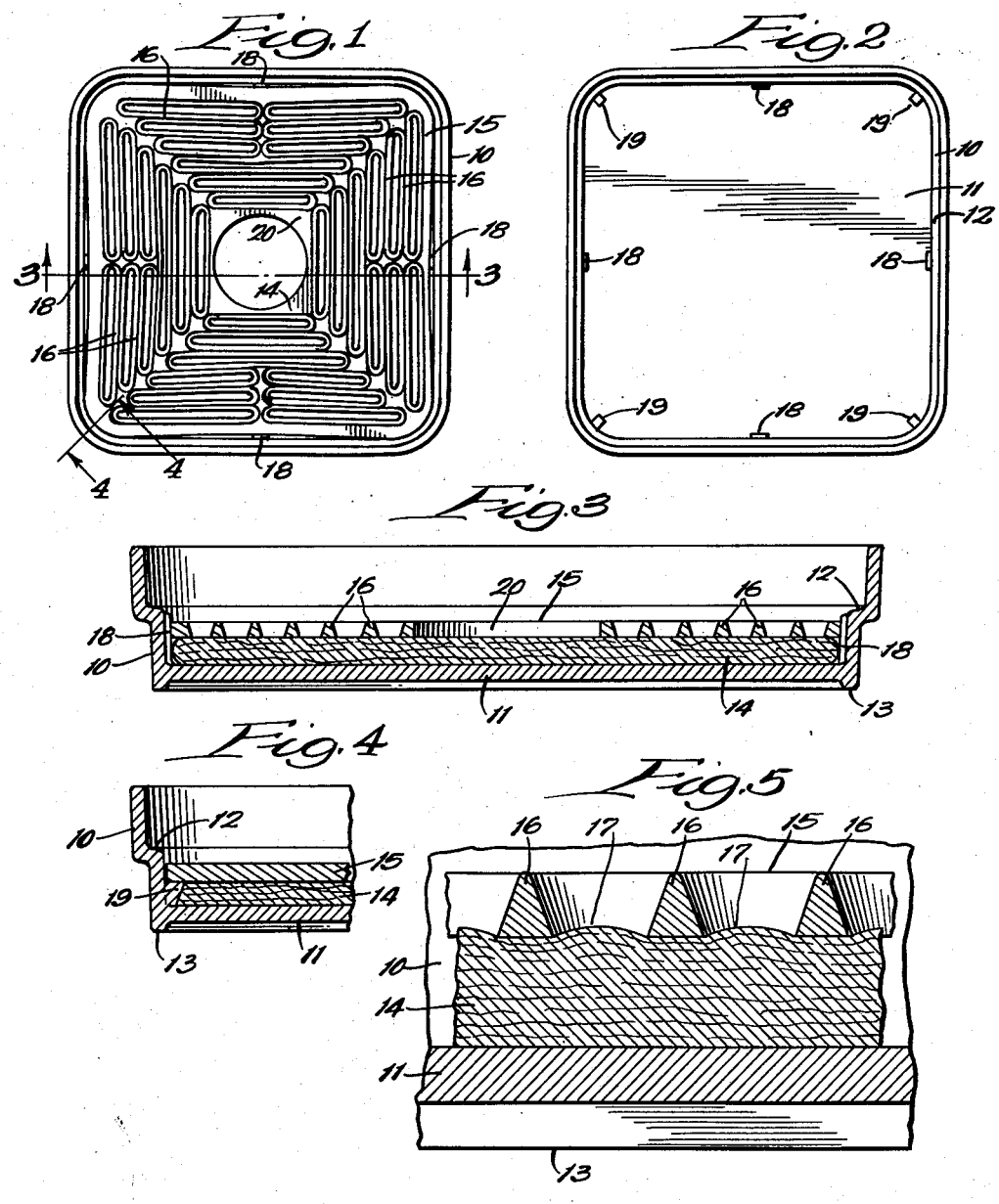
INVENTOR:
Jane M. Keegan,
BY Dawson, Ooms, Booth and Spangenberg,
ATTORNEYS.

Patented Sept. 22, 1953

2,652,703

UNITED STATES PATENT OFFICE 2,652,703

COASTER

Jane M. Keegan, Evanston, Ill.

Application October 22, 1949, Serial No. 122,873

4 Claims. (Cl. 65—53)

This invention relates to a coaster, and more particularly to a coaster which keeps the bottom of the glass resting thereon free of moisture.

An object of the invention is to provide a coaster of inexpensive structure which is effective in keeping moisture from collecting about the bottom of the glass and dripping therefrom. Yet another object is to provide a coaster support for glasses which is effective in rapidly removing water droplets condensing upon a glass and running down toward the bottom of the glass. Yet another object is to provide a coaster equipped with an absorbent layer which is effectively secured within the coaster structure while permitting the ready removal of the absorbent material and its replacement with new absorbent as desired. A still further object is to provide a structure in which an absorbent pad is automatically crinkled in the assembly of the coaster parts so that moisture collecting on the bottom of the glass is contacted by the absorbent and quickly drawn into the body of the absorbent. Other specific objects and advantages will appear as the specification proceeds.

The invention is illustrated in the specific embodiment by the accompanying drawing, in which—

Fig. 1 is a top plan view of a coaster structure embodying my invention; Fig. 2, a view similar to Fig. 1 but showing the absorbent material and apertured plate removed therefrom; Fig. 3, a transverse sectional view, the section being taken as indicated at line 3—3 of Fig. 1; Fig. 4, an enlarged broken detail sectional view, the section being taken as indicated at line 4—4 of Fig. 1; and Fig. 5, a greatly enlarged sectional view showing the absorbent material extending into the apertures of the plate.

In the illustration given, 10 designates a vessel or casing providing a well 11. The vessel or tray member 10 may be formed of plastic, metal, composition materials, glass, or of any suitable material. Also, the tray and the apertured plate to be received therein may be formed of different materials. In the specific illustration given, the tray is provided with an inwardly-stepped shoulder 12, as shown more clearly in Figs. 3 and 4. The vessel may be provided upon its lower side with a depending annular rim 13 on which the vessel rests.

In the well below the shoulder 12 is a fibrous absorbent pad 14 which may be of any suitable material. It may be formed by a single fibrous body which fits the contour of the well or it may be formed by folding tissue paper sheets such as, for example, Kleenex, so as to fit within the well of the vessel or tray 10. The tray structure, with the plate inserted therein, may be used to support any liquid-containing vessel.

An apertured plate or grill 15 is placed over the fibrous member 14 and secured in frictional contact with the walls of the tray 10. The apertured plate 15 may be formed of any suitable material such as, for example, plastic, fiber, metal, composition materials, etc. I prefer to have the plate of resilient material so that it will frictionally engage the walls of the tray 10 to lock the fibrous material 14 therein while at the same time be readily removed therefrom. The plate 15 is provided with spaced ribs 16 which run cross-wise the plate in different directions. I prefer to have the ribs 16 tapered in vertical sections, as shown more clearly in Fig. 5, so that any water droplets on the bottom of the glass will not remain upon the top of the plate but will tend to move downwardly along the sides of the ribs 16.

I realize that the water droplets on the bottom portion of a glass are extremely tenacious and tend to cling to the glass wall and also to the top surfaces of the plate 15. In order to meet this tendency, I form the tapered ridges as shown and at the same time attempt to bring the fibrous material as far upwardly between the ribs as possible. If the plate 15 is formed of resilient material so that the outer ribs of grille 15 bend inwardly upon engagement with the tray 10, I find that this causes the fibrous pad to bunch between the ribs and to extend upwardly in arcuate wrinkles or ridges 17, as shown more clearly in Fig. 5. Not only do the ridges extend well upwardly between the ribs where they make contact with the water droplets but also the arcuate shape of the portion 17 causes the water droplets when disbursed to flow quickly toward the ribs and to enter the body of the absorbent material below the ribs.

In the illustration given, and as shown more clearly in Fig. 2, the tray 10, which may be formed of plastic material, is provided with inwardly-extending bosses 18 along the sides thereof. These bosses press against the side walls of the resilient plastic plate 15 so as to bend the ribs 16 thereof inwardly, as illustrated more clearly in Fig. 1. Thus, the bosses are effective for two purposes. They resiliently lock the plate 15 within the tray. Also, the ribs are moved inwardly over the surface of the pad by engagement with the bosses which tends to wrinkle the free surface of the pad and thereby increase the height of the ridge formations 17 between the ribs. This action is especially effective when pad 14 is composed of sheets of tissue, such as Kleenex. The superimposed sheets of soft tissue will cause pad 14 to have a fluffy, supple character. Preferably, the top surface of the pad when composed of sheets of soft tissue will extend at least to or above the top of bosses 18 in its uncompressed condition to facilitate the cooperative action just described. This will permit the upper surface of the pad to be contacted by plate 15 before or simultaneously with the contacting of the plate with the bosses 18. It will be understood that the compression of pad 15, especially when it is composed of soft, fluffy sheets of tissue, will cause wrinkles or ridges to form between ribs 16 when grille 15 is forced downwardly into frictionally locking engagement with bosses 18. This will be true even though pad 14 varies in thickness, since grille 15 will frictionally lock with bosses 18 over a range of positions.

I prefer also to equip the corners of the tray 10 with low supports or studs 19 for supporting the corners of the plate 15, as shown more clearly in Fig. 4.

The center of the plate 15 is preferably apertured at 20 so as to provide a finger opening for the ready removal of the apertured plate 15 when this is desired.

Operation

In the operation of the coaster, the absorbent pad or folded fibrous mat 14 is placed within the bottom of the tray 10. The resilient plate 15 is then placed into position by placing it downwardly onto the corner supports 19. As the plate 15 is placed downwardly, the bosses 18 of the tray press the central portion of each side wall inwardly so that the ribs bend as shown in Fig. 1. This inward movement of the ribs, together with the downward pressure against the plate, causes the arcuate absorbent ridges 17 to be formed between the ribs, as shown more clearly in Fig. 5. The structure now becomes a substantially unitary structure which may be handled as one piece because the plate 15 is tightly secured within the tray 10 and it locks the absorbent material 14 firmly in place.

When a glass is placed upon the coaster and has water droplets formed thereon and running down toward the bottom of the glass, it is found that the tapered ribs 16 render the water droplets very unstable along the bottom of the glass. At the same time, the upwardly-extending ridges 17 of the fibrous material, upon touching any portion of the downwardly-pressed droplets, cause the droplets to quickly disappear and the water thereof flows towards one edge of the particular ridge 17 and disappears within the interior of the absorbent material. There is thus a tendency for the top portion of the fibrous pad to remain relatively dry and to continue to be effective in drawing droplets into the fibrous mat.

After the coaster has been used, it is found that the pad will often dry sufficiently so that it may be reused for many different occasions. When it is desired to change the pad, this may be done by inserting the finger through the finger opening 20 and drawing the central portion of the resilient plate 15 upwardly. The pad may be replaced with a new pad and the plate quickly inserted again in its frictionally-locking position.

Not only is the coaster functionally effective for the removal of the water droplets as they form and thus effective in preventing the coaster from sticking to the glass when the glass is raised, but also the structure is extremely attractive in that the fibrous pad or folded fibrous sheet gives the effect of a napkin disposed below the glass. Further, the entire structure, when the spring plate 15 is in position, operates as a single structure and there is no tendency for the parts to become separated during use.

The tray 10 may be of any desired contour. It may be circular, square, hexagonal, or of any other desired shape. Also, the shape of the spaces in the apertured plate 15 may be modified as desired. However the spaces be varied in shape, and however the ridges be formed, I prefer that such ribs or frame portions which extend upwardly into contact with the glass be tapered or that they provide an extremely narrow upper edge resting in contact with the glass so that there is no tendency for droplets to rest thereon. Such tapered or narrow edges thus provided by the ribs render the droplets unstable and cause them to assume downwardly-bulging positions where they tend to engage the absorbent ridges 17. Upon contact with such ridges, the water droplets quickly lose their globular form and flow as liquid into the absorbent body.

While in the foregoing specification I have set forth certain structures in considerable detail for the purpose of illustrating an embodiment of the invention, it will be understood that such details of structure may be varied widely by those skilled in the art without departing from the spirit of my invention.

I claim:

1. A coaster comprising a tray providing a generally rectangular well surrounded by substantially straight sides, at least one side of each pair of oppositely-disposed sides being equipped intermediately with a boss projecting from the side into said well and providing a vertically-extending camming surface on the inner edge thereof, a disposable absorbent body within said well composed of soft sheets of tissue paper lying in stacked parallel relation to the bottom of said well, said body being compressible from its normally expanded condition with the upper surface thereof above the top of said bosses to a position below the top of said bosses, and a resilient rectangular plate dimensioned to be received within said well with the sides thereof bowed inwardly by the camming surfaces of said bosses, said rectangular plate having spaced-apart crosswise ribs with crosswise openings therebetween, said plate being frictionally locked within said well with the sides adjacent said bosses pressed inwardly by the camming surfaces of said bosses and the bottom of said plate compressing said body and forming the top portion of said body into wrinkles between said ribs extending upwardly into said openings.

2. A coaster comprising a tray providing a square well surrounded by substantially straight sides, each of said sides being equipped intermediately with a boss projecting from the side into said well and providing a vertically-extending camming surface on the inner edge thereof, a disposable absorbent body within said well composed of soft sheets of tissue paper lying in stacked parallel relation relative to the bottom of said well, said body being compressible from its normally expanded condition with the top surface thereof above the top of said bosses to a position below the top of said bosses, and a resilient square plate dimensioned to be received within said well with the sides thereof bowed inwardly by said bosses, said square plate having a central opening surrounded by spaced crosswise ribs with crosswise openings therebetween, the ribs and openings adjacent each side of said plate running generally parallel to the adjacent side, said plate being frictionally locked within said well with its sides pressed inwardly by said bosses and with its bottom compressing said body and forming the top of said body into wrinkles between said ribs extending upwardly into said openings.

3. A coaster comprising a tray providing a generally rectangular well surrounded by substantially straight sides, at least one side of each pair of oppositely-disposed sides being equipped intermediately with at least one boss projecting from the side into said well and providing a vertically-extending camming surface of the inner edge thereof, a disposable absorbent body within said well, and a resilient rectangular plate received within said well above said absorbent body, said rectangular plate having spaced apart crosswise ribs with crosswise openings therebetween and having its sides bowed inwardly by the camming surfaces of said bosses so as to be frictionally locked within said well.

4. In a coaster, the combination of a tray providing a generally rectangular well adapted to receive a disposable absorbent body, said well being surrounded by substantially straight sides, at least one side of each pair of oppositely-disposed sides being equipped intermediately with at least one boss projecting from the side into said well and providing a vertically-extending camming surface on the inner edge thereof, and a resilient rectangular plate received within said well with the sides thereof bowed inwardly by the camming surface of said bosses, said rectangular plates having spaced-apart crosswise ribs with crosswise openings therebetween and provided centrally with a finger opening for the removal of the plate, said plate being frictionally locked within said well with the sides thereof adjacent said bosses pressed inwardly by the camming surfaces of said bosses.

JANE M. KEEGAN.

References Cited in the file of this patent
UNITED STATES PATENTS

| Number | Name | Date |
|---|---|---|
| 482,603 | Weigel | Sept. 13, 1892 |
| 506,120 | Kiel | Oct. 3, 1893 |
| 980,852 | Van Court | Jan. 3, 1911 |
| 1,862,533 | Fish | June 14, 1932 |
| 1,957,263 | Gray | May 1, 1934 |
| 2,003,895 | Martin | June 4, 1935 |
| 2,118,326 | Richardson | May 24, 1938 |
| 2,496,157 | Gaudino | Jan. 31, 1950 |

FOREIGN PATENTS

| Number | Country | Date |
|---|---|---|
| 18,899 | Switzerland | Sept. 29, 1899 |
| 24,932 | Austria | July 10, 1906 |
| 58,381 | Switzerland | Mar. 20, 1912 |
| 81,276 | Germany | May 21, 1895 |
| 299,659 | Great Britain | Nov. 1, 1928 |
| 542,788 | Great Britain | Jan. 27, 1942 |
| 792,519 | France | Oct. 21, 1935 |